Figure 1:
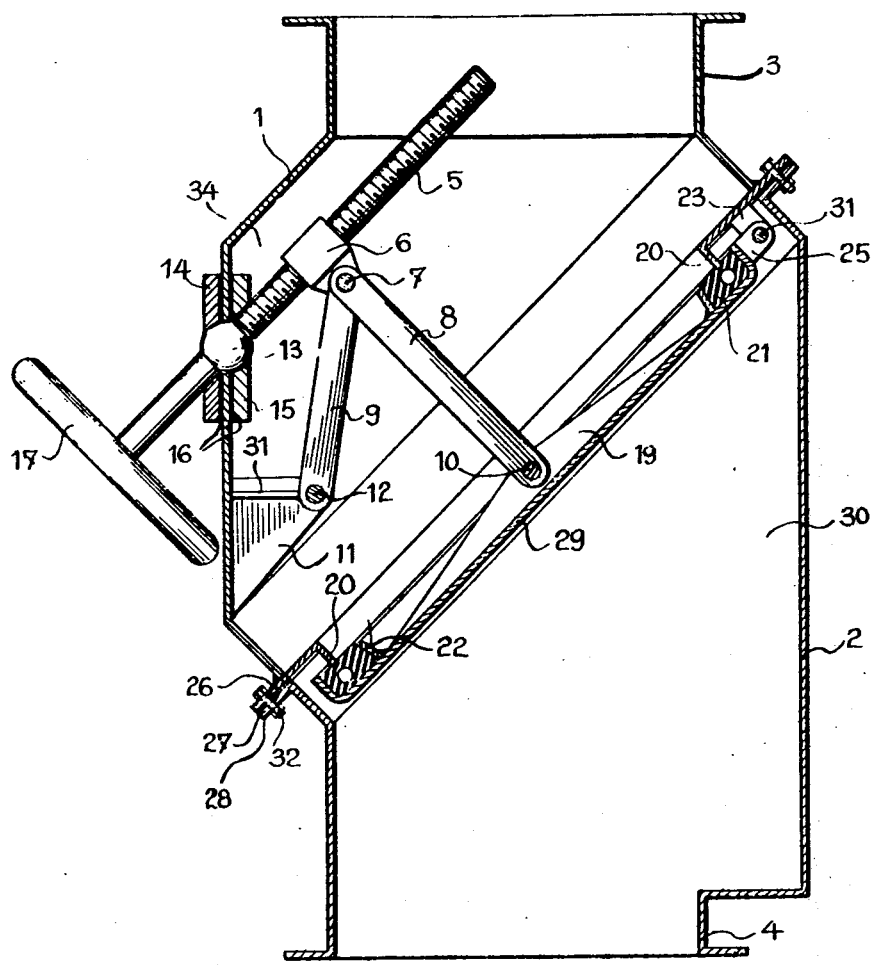

United States Patent [19]

LeRoch

[11] 4,120,483
[45] Oct. 17, 1978

[54] STOP VALVE

[76] Inventor: Jacques LeRoch, 2261 Marmier, Apt. 7, Longueuil, Quebec, Canada, J4K 4V1

[21] Appl. No.: 790,651

[22] Filed: Apr. 25, 1977

[51] Int. Cl.² .................. F16K 31/44; F16K 31/50
[52] U.S. Cl. ............................. 251/229; 251/228; 74/89.15
[58] Field of Search ............... 251/228, 229; 74/89.15, 74/424.5 R

[56] References Cited

U.S. PATENT DOCUMENTS

| 1,561,544 | 11/1925 | How | 251/299 |
| 3,043,160 | 7/1962 | Killian | 74/89.15 |
| 3,510,101 | 5/1970 | Burtis | 251/228 |

FOREIGN PATENT DOCUMENTS 19,589 of 1893 United Kingdom ................ 251/229

Primary Examiner—Martin P. Schwadron
Assistant Examiner—A. Michael Chambers

[57] ABSTRACT

This invention is concerned with a stop valve of the type mounted along a fluid carrying pipe, which comprises a closing valve plate hinged about one fixed pin mounted on one internal side of a pipe and operating means for opening and closing the valve plate in the pipe. In accordance with the invention, the operating means consist in at least two articulated links forming an angle lower than 180° therebetween, one of the extremities of said two links being mounted on the valve plate, the other extremity being mounted on the internal side of the pipe opposite to the side where is mounted the hinging pin of the closing valve, and control means extending from said internal side opposite to the side where the hinging pin is mounted to the articulation of the two links, for moving the latter and thus opening or closing the angle formed between the two links. The control means for moving the articulation of the two links preferably consist of a wheel external to the pipe, a shaft carrying a screw being operated by said wheel, said shaft being mounted on the wall of the pipe by a ball-and-socket joint so as to be fixed in translation but not in rotation, and a nut mounted in a movable manner on the screw portion of the shaft and fixed by a yoke to the articulation of the two links.

8 Claims, 2 Drawing Figures

STOP VALVE

The present invention relates to a stop valve of the type mounted along a fluid carrying pipe, and, more particularly, to a stop valve of the type inserted in an air duct.

Fluid carrying pipes, and more especially air ducts, are used in numerous technical fields, such as in shipbuilding, house heating or plant ventilation systems, for carrying fluid, hot or cold air, foul air, etc...

Sometimes, it becomes necessary to close these pipes or ducts for various reasons apart from maintenance. For example, it may be necessary to increase or decrease the pressure in a room or completely and tightly isolate the latter. It may also be necessary to stop the combustion of an inflammable product such as fuel, in an airtight chamber.

Aboard merchant or war ships having a huge tonnage, every tank for storing fuel, water, wine, etc..., is provided with a fresh air inlet and a foul air outlet system. The tightness of the up-to-now known stop valves used for closing these air inlets and air outlets is indeed inadequate although tolereated. In addition, the known stop valves are usually made of bronze or brass because of the oxidizing marine atmosphere and are moulded in small quantities, and consequently they are expensive, heavy and voluminous. These drawbacks are quite detrimental when particularly considered in terms of weight and surface area available.

An object of the present invention is to provide a stop valve free of the above-mentioned drawbacks, particularly in regard of shipbuilding.

Another object of the present invention is to provide a stop valve which is of a solid structure, easy to manufacture and use, and well protected against corrosion.

A further object of the present invention is to provide a stop valve which also has a very good fluid tightness.

These objects are achieved with a stop valve essentially comprising a closing valve plate hinged about one fixed pin mounted on one internal side of a pipe, and operating means for opening and closing the valve plate in the pipe.

In accordance with the invention, the operating means includes at least two articulated links forming an angle lower than 180° therebetween, one of the extremities of said two links being mounted on the valve plate, the other extremity being mounted on the internal side of the pipe opposite to the side where is mounted the hinging pin of the closing valve, and control means extending from said internal side opposite to the side where the hinging pin is mounted to the articulation of the two links, for moving the latter and thus opening or closing the angle formed between the two links.

According to a first preferred embodiment, the control means for moving the articulation of the two links consist of a wheel external to the pipe, a shaft carrying a screw being operated by said wheel, said shaft being mounted on the wall of the pipe by a ball-and-socket joint so as to be fixed in translation but not in rotation, and with its screw portion located within the valve housing and carrying a nut mounted in a movable manner on the screw and fixed by a yoke to the articulation of the two links.

According to another embodiment, the operating means for moving the articulation of the links consist of an hydraulic or pneumatic actuator located inside the pipe but operated from the outside thereof.

Preferably, the stop valve according to the present invention is almost entirely of steel protected against corrosion by aluminum projected under pressure. Such a stop valve form an entirely welded assembly which is of a particular advantage, and is adaptable to pipes of various shapes (round or polygonal-shaped pipes). Such a stop valve is moreover very light. Of course, its weight depends on its size. However, the stop valve according to the present invention is from 4 to 10 times lighter than the stop valves which are presently available.

For the above reasons, its manufacturing cost is low.

Figure 2:
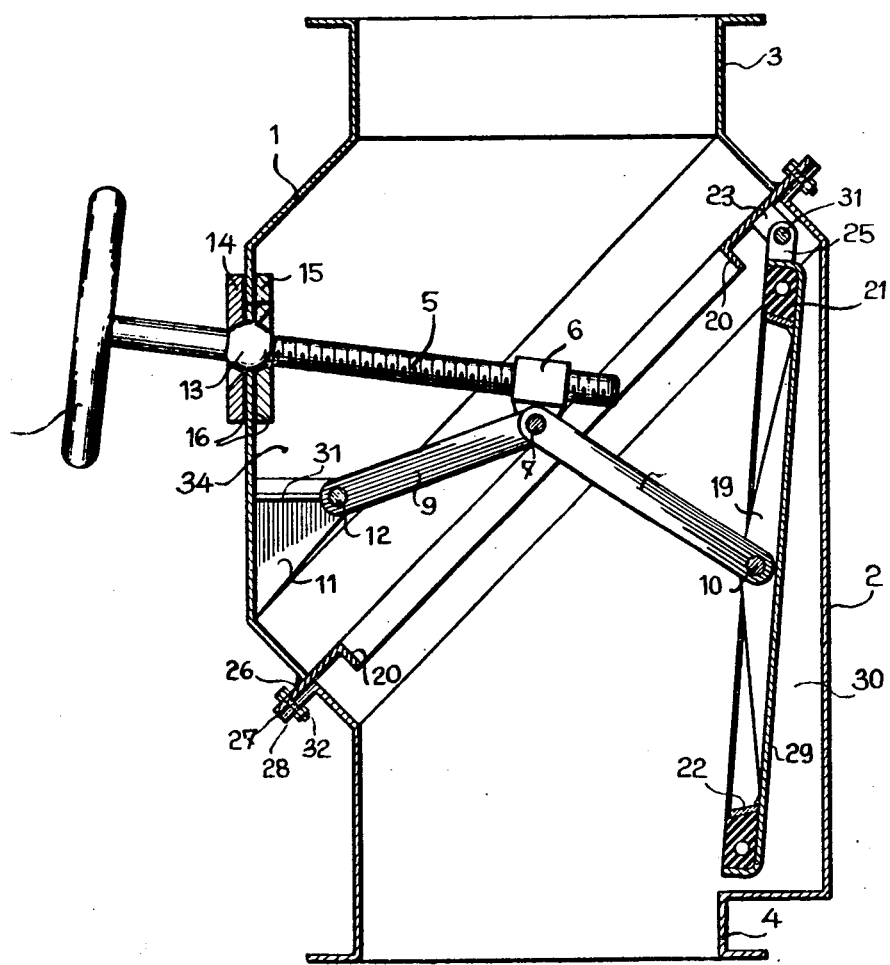

A preferred embodiment of the present invention will be hereinafter described with reference to the accompanying drawings wherein:

FIG. 1 is a longitudinal view in cross-section of a stop valve according to the present invention in closed position and FIG. 2 is a longitudinal view in cross-section of the same stop valve in opened position.

Referring to the accompanying drawings, the stop valve includes a valve body formed of two half-bodies 1 and 2 assembled by means of two connecting flanges 26 and 28 separated by a seal 27. The clamping of these flanges and seal is made by a number of bolts 32 each provided with a stop ring (not shown).

The two half-bodies are assembled along a plane making an angle of 45° with respect to the longitudinal axis of the pipe. It is pointed out that this 45° angle is chosen so as to substantially reduce to a minimum the dimension of the stop valve. However, any angle selected between 20° to 70° is quite acceptable.

The connecting flange 26 extends inside the halfbody 1, and acts as a divider plate which divides the valve body into two chambers. The articulating yokes 23 of the closing valve plate 29 are welded to the internal side of flange 26, within one of the chambers along a first side of the valve body. A short strip of metal 20 is welded all around the internal periphery of an opening in the divider plate formed by the flange 26, and constitutes a valve seal. This short strip 20 permits to reduce considerably the bearing surface between the flange 26 and a seal 21 mounted on valve plate 29, and thus ensures a better tightness.

The valve plate 29 is provided at its external periphery with at least one yoke 25 which is mounted in cooperative relationship with the articulation yokes 23. The number of yokes 23 and 25 used depends on the number of articulations desired. Generally, there are two articulations. The articulation pins 31 are locked in position by means of stop bolts, not shown in the drawings.

The above-mentioned tightness seal 21 is located inside the valve plate 29. This seal can be of a shape shown in the drawing or of any other desirable shape. The seal 21 is held in position by a plate 22 butt-welded or fillet-welded on the valve plate 29. Several radial ribs 19 are fillet-welded onto the valve plate 29 for reinforcing the latter and for evenly distributing the tightening stress all over the plate 29. Depending on their position, one or more of these ribs are used as an articulation yoke for the link 8 hinged about a pin 10 held in place by means of a locking pin (not shown).

The half-body 2 includes a hollow recess 30 along the first side of said valve body, into which the valve plate 29 is received in open position in order to completely clear the passage of fluid.

As can be seen, the half-body 1 which bears the valve plate 29, also comprises all of the mechanical operating means used for opening or closing the plate 29. Such an arrangement allows the easy dismantling of the stop valve when necessary.

The half-body 1 includes a hollow recess 34 along a second side of the valve body, opposite the first side, and in which are mounted the above-mentioned mechanical control means. These control means comprise an external wheel 17, a shaft carrying a screw 5 on its inner end portion, and which can rotate freely but is fixed in translation, a nut 6 which is fixed against rotation, and two articulated links 8 and 9.

The wheel 17 can be of any standard type with an adequately selected diameter or can be fabricated by curving and welding a tube. An optional operating wrist (not shown) can be mounted on the wheel.

The shaft carrying the screw 5 is mounted on the half-body 1 along the second side of the valve body by means of a ball 13 mounted in a socket fixed on the swelled wall of the half-body 1. This socket has a diameter slightly larger than the diameter of the bolt. The shaft carrying the screw 5 and its ball 13 are rotatably mounted on the half-body 1 by means of two half-sockets 14 and 15 which are mounted on the swelled wall. The tightness of this ball 13 is insured by means of a seal 16.

The shaft carrying the screw 5 has at its external end a square tip which can be fixed on the wheel 17 and a cylindrical portion extending from this tip to the ball 13. The threaded portion 5 of the shaft is located inside the stop valve. The shape of the thread as well as the pitch of the screw are selected depending on the undergoing stresses.

The nut 6 which is fixed in rotation includes an articulation yoke provided with a pin 7 on which are mounted the links 8 and 9. The nut 6 can also include two lateral pins perpendicular to the axis of the screw valve for mounting each of the links.

The link 8 is preferably of rectangular cross-section. This link is articulated about the above-mentioned pins 10 and 7.

The link 9 is also of a rectangular cross-section. One end of this link 9 is articualted about the pin 7. The other extremity of this link 9 is articulated about a pin 12 mounted on support 11 welded in the recess 34 of the half-body 1 and located in the plane comprising the main axis of the pipe and the center of the ball 13. The articulation support 11 can be reinforced by one or several ribs 31.

In order to be easily used, both half-bodies 1 and 2 are provided with flanges 3 and 4, respectively. These flanges, which may be of any shape depending on the shape of the pipe on which the stop valve is mounted, are welded to the half-bodies 1 and 2 respectively.

Moreover, the half-bodies 1 and 2 are made of welded steel plates. The valve plate 29 is made of pressed steel plate. The nut 6 and the two half-sockets 14 and 15 are made of bronze, and the seals 16, 21 and 27 are made of rubber, or like material. When the stop valve is used as a fire-proof valve, the seals 21 and 27 are preferably made of a fire resistive material.

When a protection against oxidation is especially required, such as, for example, aboard a ship, every non-bright parts of the stop valve can be protected by any known method such as by projection of aluminum under pressure.

When the wheel 17 is operated, the shaft carrying the screw 5 rotates and moves the nut 6 longitudinally along its axis, as the latter is locked against rotation by the links 8 and 9. As the pivot pins 12 and 31 and the ball 13 are fixed, the articulating pin 7 moves along an arc of circle. The link 8 then drives the valve plate 29, by means of the articulation 10, which opens or closes in a gyratory movement about the pin 31.

It is to be noted that the valve plate 29 can be set in any possible intermediary position between the fully opened position and the completely closed position, because of the reversibility of the system screw-nut.

The above-described stop valve possesses an outstanding tightness. This is due to the fact that the links 8 and 9 are set at angle, thereby acting as a multiplying lever. The smaller the angle between the two links is, the greater the multiplying factor will be, and the greater the contact pressure applied by the plate 29 and seal 21 on the metal strip 20 will be.

It is preferable that the stop valve be so mounted on the pipe that the air or the fluid circulating through the pipe moves in the valve closing direction, i.e. referring to the drawings, from the bottom to the top of the valve. It is readily apparent that, in this case, the pressure of the fluid on the valve plate 29 increases the closing forces on this plate 29 and on its seal 21 on the short strip 20, when the stop valve is in the closed position.

Of course, the present invention is not limited to the above examplified embodiments but extend to all alternative forms.

For example, use can be made of an electric motor connected either directly or by an homocinetical joint to the screw 5 for operating the same. Use can also be made of an hydraulic or pneumatic jack in lieu of the screw, for opening or closing the valve plate. In this case, the jack is controlled from the outside and is mounted along the pipe wall opposite to that bearing the valve plate articulating mechanism, on a pivot. This latter embodiment may be particularly useful when the stop valve is of a large size.

I claim:
1. A stop valve, comprising:
   a valve body defined by wall means, and having a longitudinal axis;
   divider plate means extending across the interior of said valve body and dividing it into first and second chambers, said divider plate means lying at an angle to said longitudinal axis and carrying a valve seat means;
   a valve plate received within said first chamber and pivotally mounted at a location along one side of said valve body to be movable between a closed position in engagement with said valve seat means, and an open position swung away from said valve seat means toward said one side of said valve body; and
   control means operable for moving said valve plate between said open and closed positions thereof, said control means including:
   a shaft, having an outer end disposed outside said valve body and an inner end portion within said valve body, the outer end of said shaft being adapted to carry handle means, the inner portion thereof being threaded, and said shaft carrying ball means thereon positioned between said outer end and said threaded inner end portion;
   socket means mounted on said wall means within said second chamber on an opposite side of said valve body from said one side, and adapted to receive said ball means to thereby mount said shaft for both rotational and pivotal movement, the threaded inner portion of said shaft extending toward said valve seat where said valve is in said open position;

nut means received on said threaded inner portion of said shaft; and a first and a second link, having inner and outer ends the inner ends of said links being pivotally connected to each other and to said nut means, the outer end of said first link being pivotally connected to said valve plate, and the outer end of said link being pivotally connected to said wall means within said second chamber on said opposite side of said valve body, said first and said second links being arranged to define a "V" relative to said nut means and forming an angle therebetween less than 180°, whereby when said shaft is rotated in a first direction to close said stop valve, said nut means will be moved toward said socket means and the angle between said first and said second links will progressively become smaller, effecting movement of said valve plate toward its closed position, and vice versa.

2. A stop valve as recited in claim 1, wherein said valve seat means includes an opening in said divider plate, and a strip of metal welded around the periphery of said opening, said valve plate carrying a seal positioned to be engaged by said strip of metal when said stop valve is closed.

3. A stop valve as recited in claim 2, wherein said valve plate includes reinforcing ribs, said outer end of said first link being pivotally connected to at least one of said ribs, and said ribs being used for evenly distributing the tightening forces all over the valve plate.

4. A stop valve as recited in claim 3, wherein said seal carried by the valve plate is made of a fire resistive material, so that said stop valve can be used as a fire proof valve.

5. A stop valve as recited in claim 1, wherein said valve body includes a hollow recess along said one side thereof, into which said valve plate is receivable upon opening of said stop valve in order to completely clear the passage through said valve body.

6. A stop valve as recited in claim 1, wherein said valve body is comprised of two half bodies assembled along a plane making an angle ranging from about 20° to about 70° with respect to said longitudinal axis.

7. A stop valve as recited in claim 6, wherein said divider plate lies in the same plane as that along which the two half bodies are assembled.

8. A stop valve as recited in claim 7, wherein said divider plate is carried by one of said half-bodies, the same half-body carrying said socket means, and said valve plate being pivotally mounted on said divider plate.

* * * * *